(12) United States Patent
Seror

(10) Patent No.: US 7,454,275 B2
(45) Date of Patent: Nov. 18, 2008

(54) METHOD OF MEASURING THE COMPRESSION OF A SHOCK ABSORBER, AND AN AIRPLANE UNDERCARRIAGE CONSTITUTING AN APPLICATION THEREOF

(75) Inventor: Christelle Seror, Chatenay Malabry (FR)

(73) Assignee: Messier-Dowty S.A., Velizy Villacoublay (FR)

( * ) Notice: Subject to any disclaimer, the term of this patent is extended or adjusted under 35 U.S.C. 154(b) by 339 days.

(21) Appl. No.: 11/109,147

(22) Filed: Apr. 19, 2005

(65) Prior Publication Data
US 2005/0230200 A1 Oct. 20, 2005

(30) Foreign Application Priority Data
Apr. 19, 2004 (FR) .................................. 04 04091

(51) Int. Cl.
*B62C 3/00* (2006.01)
*B60G 17/04* (2006.01)
(52) U.S. Cl. ......................................... 701/37; 280/5.5
(58) Field of Classification Search ............. 701/36–37; 73/11.04, 290 R; 280/5.5; 116/227
See application file for complete search history.

(56) References Cited

U.S. PATENT DOCUMENTS 4,092,947 A * 6/1978 Labrecque .................. 116/227

5,104,144 A 4/1992 Bethell
5,371,598 A 12/1994 Ghaem et al.

FOREIGN PATENT DOCUMENTS

JP 11072132 3/1999
WO WO 2004/028902 A1 4/2004

\* cited by examiner

*Primary Examiner*—Yonel Beaulieu
(74) *Attorney, Agent, or Firm*—McCormick, Paulding & Huber LLP

(57) ABSTRACT

An airplane undercarriage including a shock absorber having first and second portions that are movable relative to each other. The undercarriage further including a first wave transceiver assembly disposed on the first movable portion. The assembly includes a first transmitter for transmitting a first wave towards the second movable portion and a first receiver for receiving the first wave after it has been reflected on an obstacle formed by a mechanical part secured to the second movable portion. The undercarriage also includes an independent second wave transceiver assembly disposed on the first movable portion. The second assembly includes a second transmitter for transmitting a second wave towards the second movable portion, and a second receiver for receiving the second wave after it has been reflected on an obstacle formed by a free surface of a hydraulic fluid contained in the shock absorber or a mechanical part defining the free surface.

4 Claims, 1 Drawing Sheet

METHOD OF MEASURING THE COMPRESSION OF A SHOCK ABSORBER, AND AN AIRPLANE UNDERCARRIAGE CONSTITUTING AN APPLICATION THEREOF

CROSS-REFERENCE TO RELATED APPLICATIONS

This application is entitled to the benefit of French Patent Application No. 0404091 filed on Apr. 19, 2004, herein incorporated in its entirety.

FIELD OF THE INVENTION

The invention relates to a method of measuring the theoretical level of hydraulic fluid in a shock absorber, and to an airplane undercarriage constituting an application thereof.

BACKGROUND OF THE INVENTION

Document JP 11 072132 discloses a suspension comprising a shock absorber having a first portion and a second portion that are slidably movable relative to each other, the shock absorber being fitted with a wave transceiver assembly disposed on the first movable portion, the transmitter being disposed to transmit the wave towards the second movable portion, and the receiver being suitable for receiving the wave after it has been reflected on an obstacle formed by a mechanical part secured to the second movable portion.

By measuring the travel time of the wave, it is possible to deduce the compression of the shock absorber.

In a variant mentioned in that document, the shock absorber is fitted with a transceiver assembly adapted to send a wave to an obstacle formed by the free surface of a hydraulic fluid contained in the shock absorber or a mechanical part defining said free surface.

By measuring the travel time of the wave, it is possible to deduce the real level of hydraulic fluid in the shock absorber. By knowing the relationship between shock absorber compression and the theoretical level of hydraulic fluid in the shock absorber, it is possible to deduce therefrom the extent to which the shock absorber is compressed.

However, applying that method assumes that the shock absorber was properly conditioned and has not suffered any leakage of hydraulic fluid, such that the theoretical level of hydraulic fluid and the real level of hydraulic fluid are the same.

If an incorrect quantity of hydraulic fluid was introduced into the shock absorber, or if the shock absorber has suffered from leakage, then the real level of hydraulic fluid can be different from the theoretical level of hydraulic fluid, so that the wrong degree of compression is deduced therefrom.

OBJECT OF THE INVENTION

An object of the invention is to provide a measurement method serving to determine the theoretical level of hydraulic fluid in the shock absorber.

BRIEF DESCRIPTION OF THE INVENTION

According to the invention, the method of measuring the compression of a shock absorber comprising first and second portions slidably movable relative to each other comprises the steps of:

using a first transmitter located on the first moving portion to transmit a first wave suitable for propagating without a physical medium towards the second movable portion;

using a first receiver disposed on the first movable portion to receive the first transmitted wave after the transmitted wave has been reflected on a mechanical part secured to the second movable portion; and deducing a theoretical level of hydraulic fluid in the shock absorber from a measured characteristic of the first wave as received in this way.

The measurement enables the compression of the shock absorber to be determined, and by making use of the relationship between compression and the theoretical level of hydraulic fluid, or indeed by using tables, it is possible to deduce therefrom the theoretical level of hydraulic fluid that would correspond to the compression if the shock absorber were correctly conditioned.

Preferably, the method of the invention further comprises the steps of:

using a second transmitter disposed on the first movable portion to transmit a second wave suitable for propagating without a physical medium towards the second movable portion;

using a second receiver located on the first movable portion to receive the second transmitted wave after reflection of the transmitted wave on a free surface of the hydraulic fluid or on a mechanical part defining said free surface; and deducing a real level of hydraulic fluid in the shock absorber from a measured characteristic of the second wave as received in this way.

The real level of hydraulic fluid is then determined in a manner similar to determining the compression of the shock absorber by two transceiver assemblies operating in parallel.

It should be observed that the two assemblies do indeed determine two parameters that are different: the first assembly serves to determine a theoretical level of hydraulic fluid, while the second assembly serves to determine the real level of hydraulic fluid.

In which case, advantageously, the method of the invention includes a step of comparing the real level of hydraulic fluid with the theoretical level of hydraulic fluid. This comparison makes it possible to deduce therefrom information concerning the conditioning of the shock absorber.

The invention also provides an airplane undercarriage including a shock absorber having first and second portions slidably movable relative to each other, the undercarriage further including: a first wave transceiver assembly disposed on the first movable portion, the transmitter being disposed to transmit a first wave towards the second movable portion, and the receiver being suitable for receiving the first wave after it has been reflected on an obstacle formed by a mechanical part secured to the second movable portion; and an independent second transceiver assembly disposed on the first movable portion, the transmitter being disposed to transmit a second wave towards the second movable portion, and the receiver being suitable for receiving the second wave after it has been reflected on an obstacle formed by a free surface of a hydraulic fluid contained in the shock absorber or a mechanical part defining said free surface.

Advantageously, the transceiver assemblies are disposed on the undercarriage in such a manner that the paths followed by the waves transmitted by the transceiver assemblies are contained fully within the shock absorber.

BRIEF DESCRIPTION OF THE DRAWING

The invention will be better understood in the light of the following description given with reference to the figures of the accompanying drawing, in which.

DETAILED DESCRIPTION OF THE INVENTION

Figure 1:
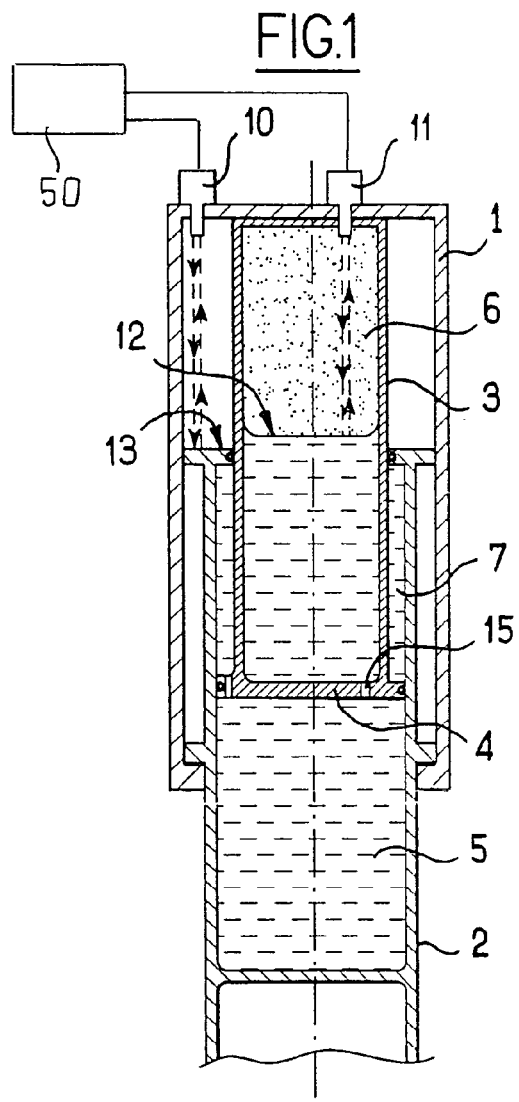
FIG. 1 is a fragmentary section view of an airplane undercarriage of the invention.

As shown in FIG. 1, the invention applies to an undercarriage fitted with a so-called "conventional" shock absorber, of a type that is indeed well known.

Such a shock absorber comprises a strut 1 having a rod 2 slidably mounted therein. For a direct undercarriage, the strut is directly connected to the airplane (usually via a hinge), and the rod carries wheels of the airplane at its bottom end.

Inside the rod 2 there extends a dip tube 3 terminated by a diaphragm 4. The shock absorber as constructed in this way has three functional chambers:

- a first chamber 5 referred to as an oil chamber which extends inside the rod 2 and which is closed by the diaphragm 4;
- a second chamber 6 referred to as an air chamber which corresponds to the inside volume of the dip tube 3; and
- an annular third chamber 7 referred to as an expansion chamber, extending between the rod 2 and the dip tube 3.

The shock absorber contains a hydraulic fluid (symbolized in the figures by horizontal dashes) which, in the extended position of the shock absorber as shown, fills the oil chamber 5 and the expansion chamber 7 in full, and fills the air chamber 6 in part. The volume remaining in the air chamber is filled with nitrogen under pressure (symbolized in the figures by dots).

When the shock absorber is compressed (e.g. during landing), the rod 2 slides in the strut, thereby causing hydraulic fluid to be transferred from the oil chamber 5 towards the air chamber 6 and the expansion chamber 7 via throttling orifices 15 passing through the diaphragm 4. The level of hydraulic fluid in the air chamber 6 thus increases progressively as the shock absorber is compressed.

In the invention, the shock absorber is fitted with a first transceiver assembly 10 mounted at the top end of the strut 1 to transmit a wave towards the top end 13 of the rod 2.

After being reflected on said top end 13, the transmitted wave returns towards the transceiver assembly 10 where it is received. An associated measurement member (which measurement member may optionally be integrated into the assembly) measures the time that elapses between the wave being transmitted and received. This time is representative of the position of the top end of the rod 2 in the strut 1, and thus of the compression of the shock absorber.

This enables a measurement to be obtained in real time of shock absorber compression without requiring any specific propagation medium since the wave propagates quite simply through air.

It should be observed that in this case the wave propagates in an internal portion of the strut where it is protected from external pollution.

It is known that the curve plotting shock absorber compression as a function of load depends on various parameters concerning the conditioning of the shock absorber, such as the initial pressure of the nitrogen (measured when the shock absorber is extended), and the volume of hydraulic fluid contained in the shock absorber. If, because of leakage, the nitrogen or the hydraulic fluid should escape form the shock absorber, it can happen that the real compression of the shock absorber does not correspond to the compression that is theoretically to be expected in the light of nominal conditioning.

The invention makes it possible at any moment to verify the conditioning state of the shock absorber by the following means: the shock absorber is fitted with a second transceiver assembly 11 likewise disposed at the top end of the strut 1 to send a wave towards the rod 2 so that the wave is reflected on the free surface 12 of the hydraulic fluid in the air chamber 6. After being reflected on said free surface 12, the wave is received by the second transceiver assembly 11. An associated measurement member (which measurement member may optionally be integrated in said assembly) measures the time that elapses between the wave being transmitted and being received. This time is representative of the real level of hydraulic fluid in the air chamber 6.

It is then easy to compare this real level with a theoretical level calculated from the measured compression of the shock absorber as obtained using the first transceiver assembly 10, and taking account of the nominal conditioning parameters. If the real level does not correspond to the theoretical level, ignoring a predetermined margin of error, then it can be deduced that the shock absorber is poorly positioned or that leakage has taken place. It is then possible to generate maintenance information automatically for the attention of the airplane pilot or of ground maintenance crews.

To do this, the airplane is preferably fitted with a computer 50 adapted to calculate a theoretical level of hydraulic fluid in the shock absorber from the measured travel time of the wave transmitted by the first transceiver assembly 10, to calculate a real hydraulic fluid level in the shock absorber from the measured travel time of the wave transmitted by the second transceiver assembly 11, to compare these two levels, and where appropriate to generate maintenance instructions for the pilot or for ground maintenance crews.

In a variant, the computer 50 may be external to the airplane and may be connected to the on-board systems of the airplane (via a cable connection or remotely), e.g. during maintenance. The computer is arranged to cause waves to be transmitted by the transceiver assemblies 10 and 11 and to make use of the travel times to verify whether the shock absorber is properly conditioned.

Figure 3:
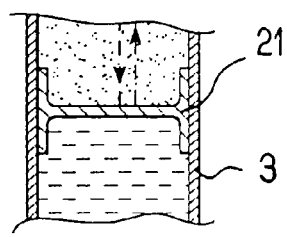
FIG. 3 is a fragmentary section view of an airplane shock absorber fitted with a separator piston.

As shown in FIG. 3, some shock absorbers are fitted with a separator piston 21 that slides freely inside the dip tube 3 so as to separate the nitrogen from the hydraulic fluid. Under such circumstances, the wave transmitted by the second transceiver assembly 11 is reflected on said separator piston 21.

Figure 4:
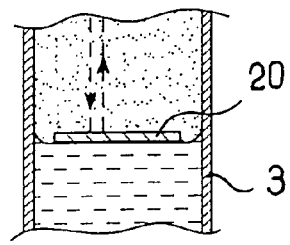
FIG. 4 is a fragmentary section view of an airplane shock absorber fitted with a floating reflector.

In order to improve the reflection of the wave transmitted by the second transceiver assembly 11, it is possible (as shown in FIG. 4) to provide a reflector 20 that slopes on the free surface of the hydraulic fluid. This reflector may cover said free surface 12 completely or in part only.

The reflector 20 or the separator piston 21 are naturally movable and move progressively into the shock absorber as the rod 2 becomes compressed into the strut 1.

It should be observed that two transceiver assemblies 10 and 11 are located at the top of the strut which makes them easier to connect electrically to the airplane, and makes it possible to avoid installing cables that run along the undercarriage, which is always difficult.

Figure 2:
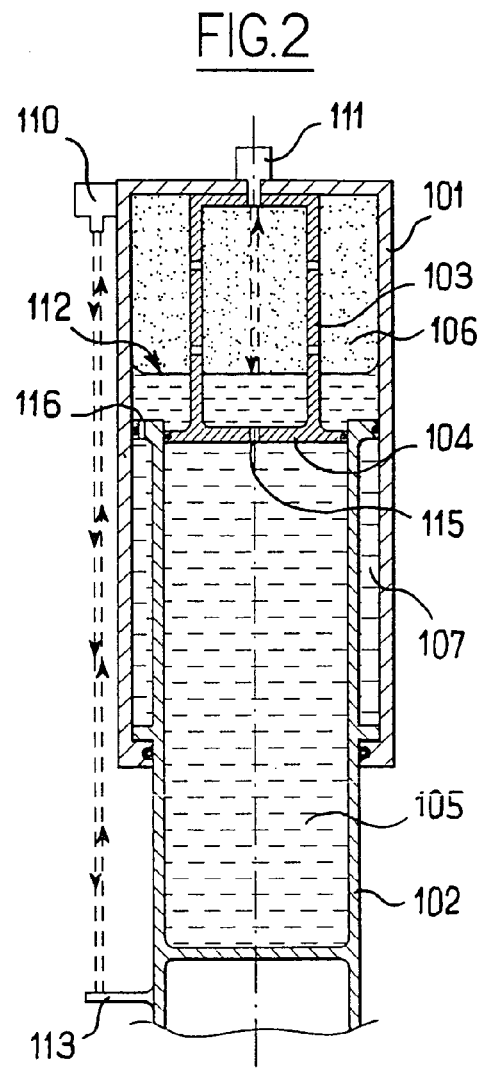
FIG. 2 is a fragmentary section view of another airplane undercarriage of the invention.

The invention also applies to an airplane undercarriage fitted with a so-called inverted shock absorber of the kind shown in FIG. 2. This shock absorber comprises a strut 101, a rod 102, and a dip tube 103 carrying a diaphragm 104. The inverted shock absorber also has an oil chamber 105 and an air chamber 106 into which the hydraulic fluid coming from the oil chamber 105 is transferred via an orifice 115 formed through the diaphragm 104 while the shock absorber is being compressed. Unlike the shock absorber shown in FIG. 1, the air chamber 106 is no longer restricted to the volume inside the dip tube, but is defined laterally by the inside wall of the strut 106.

The inverted shock absorber further comprises an expansion chamber 107, however it is no longer disposed between the rod and the dip tube, but between the rod 102 and the strut 101. In this configuration the expansion chamber 107 is fed with hydraulic fluid not from the oil chamber 105 but from the air chamber 106 via an orifice 116 formed through the top bearing of the rod 102 which slides in leaktight manner inside the strut 101.

The undercarriage is fitted with a first transceiver assembly 110 installed on the side of the strut 101 to transmit a wave towards an external reflector 113 associated with the rod 102. After being reflected on said reflector 113, the wave is received by the transceiver assembly 110. An associated measurement member measures the time that elapses between the wave being transmitted and received. This time is representative of the displacement of the reflector 113 and thus of the rod 102, and is thus representative of the compression of the shock absorber.

It should be observed that it is not possible in this configuration to place the transceiver assembly 110 in such a manner that the associated wave propagates entirely inside the shock absorber. In an inverted shock absorber, all of the top portion of the rod 102 is submerged in hydraulic fluid, so it is no longer possible to cause a wave to be reflected directly on said top portion.

However, as in a conventional shock absorber, it is nevertheless possible to place a second transceiver assembly 111 at the top of the strut 101 in such a manner that it sends a wave towards the free surface 112 of the hydraulic fluid.

The invention is not limited to the particular embodiments described above, but on the contrary covers any variant coming within the ambit of the invention as defined by the claims.

In particular, although undercarriages of the invention are shown as having shock absorbers fitted with two transceiver assemblies, it will be possible to fit the shock absorber with only one such assembly, serving to assess the theoretical level of hydraulic fluid.

Although the characteristic measured by the wave is the time that elapses between transmission and reception, it is also possible to measure other characteristics of the wave, such as its reflection ratio.

Finally, although each of the transceiver assemblies is shown as being completely integrated in a single housing, the transmitter and the receiver could be physically separate while still providing an assembly that is functional. The path of the incident wave and the path of the reflected wave then need not coincide.

What is claimed is:

1. An airplane undercarriage including a shock absorber having first and second portions that are slidably movable relative to each other, the undercarriage further including:
   a first wave transceiver assembly disposed on the first movable portion, the first wave transceiver comprising:
      a first transmitter for transmitting a first wave towards the second movable portion;
      a first receiver for receiving the first wave after it has been reflected on an obstacle formed by a mechanical part secured to the second movable portion; and
   an independent second wave transceiver assembly disposed on the first movable portion, the independent second transceiver comprising:
      a second transmitter for transmitting a second wave towards the second movable portion; and
      a second receiver for receiving the second wave after it has been reflected on an obstacle formed by a free surface of a hydraulic fluid contained in the shock absorber or a mechanical part defining said free surface.

2. An undercarriage according to claim 1, wherein the transceiver assemblies are disposed on the undercarriage in such a manner that the paths followed by the waves transmitted by the transceiver assemblies are contained fully within the shock absorber.

3. An airplane including at least one undercarriage according to claim 1, the airplane including means for determining a theoretical level of hydraulic fluid in the shock absorber from the measurement of a characteristic of the first wave, and for determining a real level of hydraulic fluid in the shock absorber from the measurement of a characteristic of the second wave.

4. An airplane according to claim 3, further including means for comparing the theoretical level of fluid in the shock absorber with the real level of fluid in the shock absorber.

* * * * *